(12) United States Patent
Botea et al.

(10) Patent No.: US 12,013,776 B2
(45) Date of Patent: Jun. 18, 2024

(54) INTELLIGENT APPLICATION SCENARIO TESTING AND ERROR DETECTION

(71) Applicant: INTERNATIONAL BUSINESS MACHINES CORPORATION, Armonk, NY (US)

(72) Inventors: Adi I. Botea, Dublin (IE); Larisa Shwartz, Greenwich, CT (US); Akihiro Kishimoto, Castleknock (IE); Radu Marinescu, Dublin (IE); Yufang Hou, Dublin (IE); Hiroshi Kajino, Tokyo (JP); Mattia Chiari, Castenedolo (IT); Marco Luca Sbodio, Castaheany (IE)

(73) Assignee: International Business Machines Corporation, Armonk, NY (US)

( * ) Notice: Subject to any disclaimer, the term of this patent is extended or adjusted under 35 U.S.C. 154(b) by 660 days.

(21) Appl. No.: 16/839,915

(22) Filed: Apr. 3, 2020

(65) Prior Publication Data
US 2021/0311860 A1    Oct. 7, 2021

(51) Int. Cl.
G06F 11/36 (2006.01)
G06N 20/00 (2019.01)

(52) U.S. Cl.
CPC ...... *G06F 11/3688* (2013.01); *G06F 11/3684* (2013.01); *G06N 20/00* (2019.01)

(58) Field of Classification Search
CPC .. G06F 11/3684; G06F 11/3699; G06N 20/00
See application file for complete search history.

(56) References Cited

U.S. PATENT DOCUMENTS

| 8,347,267 | B2 | 1/2013 | Givoni et al. |
| 8,621,279 | B1 | 12/2013 | Antukh et al. |
| 9,201,774 | B1* | 12/2015 | Cohen ............... G06F 11/3604 |
| 9,348,725 | B1 | 5/2016 | Cohen et al. |
| 9,460,408 | B2 | 10/2016 | Berlandier et al. |
| 9,582,406 | B1 | 2/2017 | Teplitsky et al. |
| 9,632,921 | B1 | 4/2017 | Yamini et al. |
| 10,122,602 | B1 | 11/2018 | Prateek et al. |

(Continued)

FOREIGN PATENT DOCUMENTS

DE    102005036321 A1    2/2007

OTHER PUBLICATIONS

Baars et al., "Using Evolutionary Testing to find Test Scenarios for Hard to Reproduce Faults", published by IEEE Computer Society, Third International Conference on Software Testing, Verification, and Validation Workshops, pp. 173-181 (Year: 2010).*
Thummalapenta et al., "Automating Test Automation", publihsed by IEEE, ICSE 2012, Zurich, Switzerland, pp. 881-891 (Year: 2012).*

(Continued)

*Primary Examiner* — S. Sough
*Assistant Examiner* — Zheng Wei
(74) *Attorney, Agent, or Firm* — Tihon Poltavets

(57) ABSTRACT

Embodiments for intelligent application scenario testing and error detection by a processor. One or more modified application scenarios may be automatically generated from an initial application scenario having configuration data and a plurality of operations relating to an error. The one or more modified application scenarios are variations of the initial application. The one or more modified application scenarios may be executed to detect the existence or non-existence of the error in the one or more modified application scenarios.

20 Claims, 7 Drawing Sheets

(56) References Cited

U.S. PATENT DOCUMENTS

| | | | |
|---|---|---|---|
| 10,402,216 B1* | 9/2019 | Bell | G06F 9/455 |
| 11,409,697 B2* | 8/2022 | Kunchakarra | G06F 9/44505 |
| 11,573,885 B1* | 2/2023 | Eizenman | G06N 3/0464 |
| 2005/0091003 A1* | 4/2005 | Wu | G06F 11/366 |
| | | | 714/25 |
| 2006/0224777 A1* | 10/2006 | Sand | G06F 11/3684 |
| | | | 714/E11.207 |
| 2007/0094542 A1 | 4/2007 | Bartucca et al. | |
| 2008/0072100 A1 | 3/2008 | Okada | |
| 2011/0035753 A1* | 2/2011 | Palczak | G06F 11/3688 |
| | | | 718/104 |
| 2013/0246359 A1* | 9/2013 | Sugiyama | G06F 16/2365 |
| | | | 707/639 |
| 2016/0283355 A1* | 9/2016 | Shani | G06F 11/3688 |
| 2017/0168911 A1* | 6/2017 | Otsuka | G06F 11/0748 |
| 2018/0365132 A1* | 12/2018 | Myron | G06F 11/3684 |
| 2019/0065221 A1* | 2/2019 | Chauhan | G06F 9/5072 |
| 2020/0012582 A1* | 1/2020 | Sharma | G06F 11/3664 |
| 2020/0133755 A1* | 4/2020 | Bansal | H04L 41/5061 |
| 2021/0224245 A1* | 7/2021 | Sharma | G06N 20/00 |
| 2021/0390011 A1* | 12/2021 | Cser | G06F 9/451 |

OTHER PUBLICATIONS

"Neural-symbolic VQA: Disentangling Reasoning from Vision and Language Understanding". Yi et al., NeurIPS 2018.

Anonymous; IPCOM000227868D; "Automated Verification and Ranking of Tests Results Using SVM"; IPCOM Publication Date May 23, 2013; (3 Pages).

Anonymous; IPCOM000233877D; "A Generalized Test Scenario for Testing Transactions Atomicity in Hardware or Software Products"; IPCOM Publication Date Dec. 25, 2013; (4 Pages).

Anonymous; IPCOM000254963D; "Detection of Deadlocks and Race Conditions in Computing Systems"; IPCOM Publication Date Aug. 17, 2018; (8 Pages).

Yuan, D. et al.; "Simple Testing Can Prevent Most Critical Failures: an Analysis of Production Failures in Distributed Data-Intensive Systems"; USENIX Symposium on Operating Systems Design and Implementation. Oct. 6-8, 2014; (18 Pages).

Roelofs, R.; "Measuring Generalization and Overfitting in Machine Learning"; http://www2.eecs.berkeley.edu/Pubs/TechRpts/2019/EECS-2019-102.pdf; (171 Pages).

Wolpert, DH.; "On the Connection Between In-Sample Testing and Generalization Error"; (48 Pages).

* cited by examiner

INTELLIGENT APPLICATION SCENARIO TESTING AND ERROR DETECTION

BACKGROUND OF THE INVENTION

Field of the Invention

The present invention relates in general to computing systems, and more particularly to, various embodiments for providing intelligent application scenario testing and error detection by a processor.

Description of the Related Art

Computing systems may be found in the workplace, at home, or at school. Processing devices, with the advent and further miniaturization of integrated circuits, have made it possible to be integrated into a wide variety of devices. In recent years, both software and hardware technologies have experienced amazing advancement. With the new technology, more and more functions are added, and greater convenience is provided for use with these computing systems.

SUMMARY OF THE INVENTION

Various embodiments for providing intelligent application scenario testing and error detection by a processor, are provided. In one embodiment, by way of example only, a method for intelligent application scenario testing and error detection, again by a processor, is provided. One or more modified application scenarios may be automatically generated from an initial application scenario having configuration data and a plurality of operations relating to an error. The one or more modified application scenarios are variations of the initial application. The one or more modified application scenarios may be executed to detect the existence or non-existence of the error in the one or more modified application scenarios.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE DRAWINGS

Figure 1:
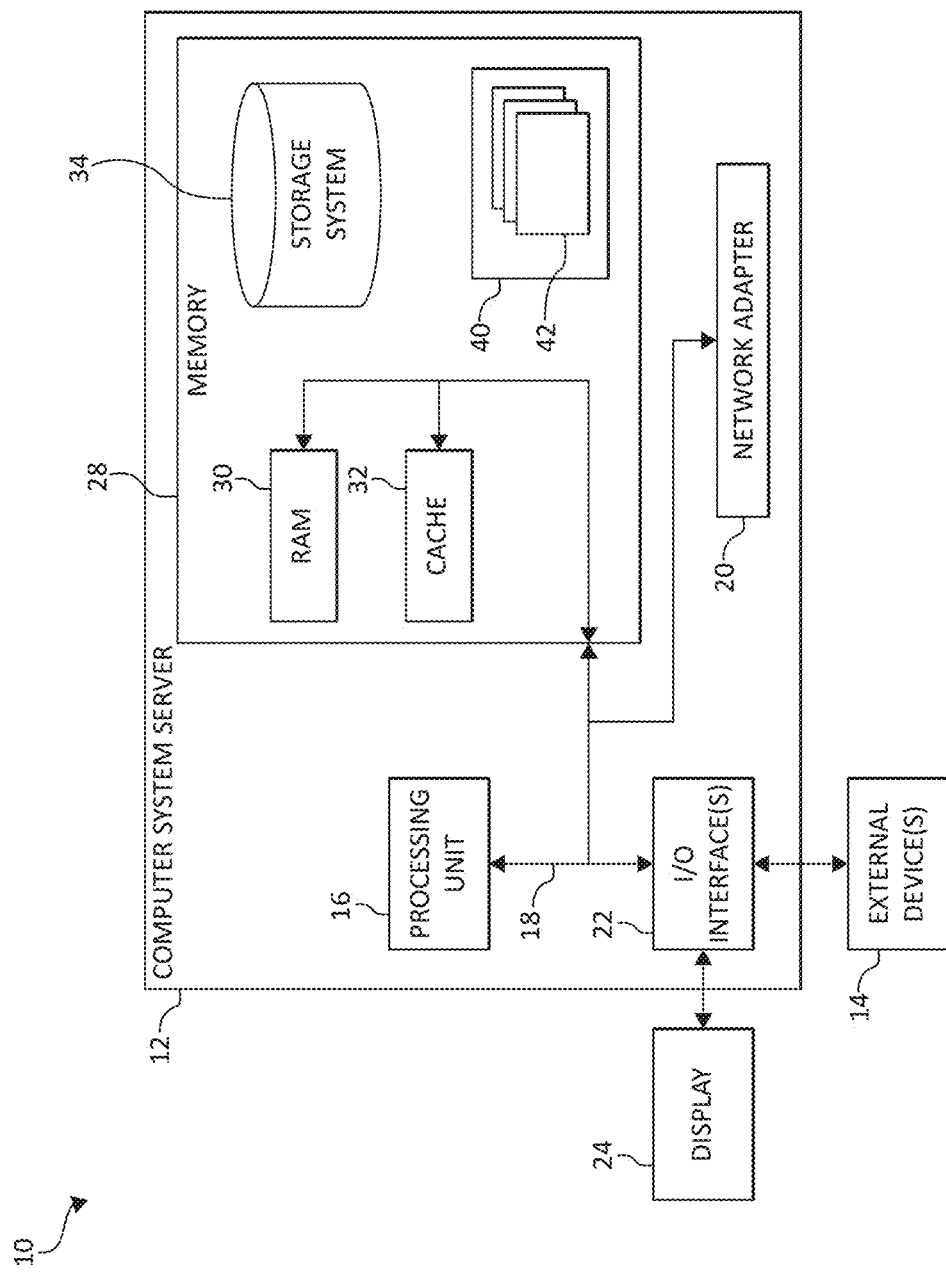
FIG. 1 is a block diagram depicting an exemplary cloud computing node according to an embodiment of the present invention.

As a preliminary matter, software development environments can be used to implement software during its development. Many components of new software can be developed over a period of time. A software development project can have a life cycle which uses resources within an organization. In the software development context, keeping a clean history of changes in the code base can significantly speed up the development, rollback and review process. There are many guidelines and utilities that can support the developer in this task, but the responsibility of following them in the expected way and at the proper time is the sole responsibility of the developer.

It is understood that when developing software or "code," software developers may break up the development process in units or code units committed piecemeal (also referred to as 'commits') throughout the life of the project. Said differently, software code (e.g., application code) may be developed by software programmers during a software development stage. Then, the code may then be "committed" which means that the software developer may release the code for testing. A "software commit" (or simply "commit") may refer to code that has been written by a software developer, but has not yet been inserted into a production environment. After fixing any bugs and each piece of code is tested, the code may then be released into production. A full cycle of testing for every commit (e.g., each unit of the software) may be administered. In some cases, time and availability of resources (e.g., physical hardware or virtual machines or hosts) can lead to reduced testing.

Upon releasing the application or software code, a technical support system (or "information technology" support system) may provide automated tools for managing and responding to technical support issues. IT support systems strive to restore normal service operations quickly to minimize negative computing system/application impact, thus ensuring high levels of service quality and availability. An incident or "event" may be any event which is not part of the standard operation of a service or application/software code and which causes, or may cause, an interruption to or a reduction in the quality of that service or application/software code. Incidents/event are the result of failures or errors in an computing system or IT infrastructure. As used herein, a reported or logged incident/event may also be interchangeably referred to as a ticket, a support ticket, an incident ticket, or a problem ticket.

However, challenges occur in IT support when data contains, in natural language, a sequence of steps to reproduce an error/problem on a given system configuration (e.g., ticket records. The support ticket problems are typically addressed for a fixed scenario, where a scenario includes a sequence of steps and system configuration. However, a similar problem may still be present under slightly different conditions such as, for example, where the operating system "OS" changes from a first type of OS to a second type of OS, or, in the alternative, only a few sequence of steps of the OS are changed. Thus, a need exists to perform a more thorough testing, across a range of scenarios, obtained by slightly modifying an original application scenario for which a problem was originally reported.

Accordingly, in one aspect, the present invention provides various embodiments that provides for intelligent application scenario testing and error detection. One or more modified application scenarios may be automatically generated from an initial application scenario having configuration data and a plurality of operations relating to an error. The one or more modified application scenarios are variations of the initial application. The one or more modified application scenarios may be executed to detect the existence or non-existence of the error in the one or more modified application scenarios.

In an additional embodiment, an initial application scenario that comprises 1) the operation steps that generate an error (e.g., an execution problem) in a computer system, 2) elements about the configuration of the computer system, and 3) information about the error caused may be received and analyzed to mine and extract the data via a natural language understanding ("NLU") operation. One or more additional scenarios, which are based on the initial scenario, may be generated. Each new scenario may be executed and tested to determine whether the error is observed. A report may be generated, created, and/or produced as output that includes the results of the execution tests and whether or not the error was observed in one or more of the various scenarios.

One or more patches may be automatically performed (e.g., a repair operation) when scenarios tested reveal the existence of a problem • System as in the main claim, further comprising that running a scenario includes mapping steps into automation mechanisms (actual ways to execute the steps), where automation mechanisms are stored in an automation database • System as in the previous claim, further comprising that steps with no mapping found in the automation library are marked, so that an expert user can extend the automation library, or perform part of the scenario steps manually, or a combination As used herein, by way of example only, "best," "appropriate," and/or "optimize" may be used herein interchangeable and refer to and/or defined as "maximize," "minimize," or attain one or more specific targets, objectives, goals, or intentions. "Best," "appropriate," and/or "optimize" may also refer to maximizing a benefit to a user (e.g., maximize a workflow pipeline). "Best," "appropriate," and/or "optimize" may also refer to making the most effective or functional use of a situation, opportunity, or resource.

Additionally, "best," "appropriate," and/or "optimize" may need not refer to a best solution or result but may refer to a solution or result that "is good enough" for a particular application, for example. In some implementations, an objective is to suggest a "best" combination of sections/items/defined objects, but there may be a variety of factors that may result in alternate suggestion of a combination of sections/items/defined objects/activities/applications yielding better results. Thus, some changes to the variety of factors may result in a jump from one minimum/maximum to another minimum/maximum. In either case, resulting suggestions of a combination of sections/items/defined objects/activities/applications of the optimal/best executor nodes may be determined by whatever "function" may be considered "good enough," "substantially optimal," and/or "sufficiently good." Herein, the terms "best," "appropriate," and/or "optimize" may also refer to such results based on minima (or maxima, depending on what parameters are considered in the optimization problem) for suggesting of a combination of optimal/best executor nodes.

In an additional aspect, the terms "optimize" and/or "optimizing" may refer to an operation performed in order to achieve an improved result such as, for example, reduced execution costs or increased resource utilization, whether or not the optimum result is actually achieved. Similarly, the term "optimize" may refer to a component for performing such an improvement operation, and the term "optimized" may be used to describe the result of such an improvement operation.

It should be noted as described herein, the term "intelligent" (or "intelligence") may be relating to, being, or involving conscious intellectual activity such as, for example, thinking, reasoning, or remembering, that may be performed using a machine learning. In an additional aspect, intelligent or "intelligence" may be the mental process of knowing, including aspects such as awareness, perception, reasoning and judgment. A machine learning system may use artificial reasoning to interpret data from one or more data sources (e.g., sensor-based devices or other computing systems) and learn topics, concepts, and/or processes that may be determined and/or derived by machine learning.

In an additional aspect, intelligent or "intelligence" may refer to a mental action or process of acquiring knowledge and understanding through thought, experience, and one or more senses using machine learning (which may include using sensor-based devices or other computing systems that include audio or video devices). Intelligent or "intelligence" may also refer to identifying patterns of behavior, leading to a "learning" of one or more events, operations, or processes. Thus, the intelligent or "intelligence" model may, over time, develop semantic labels to apply to observed behavior and use a knowledge domain or ontology to store the learned observed behavior. In one embodiment, the system provides for progressive levels of complexity in what may be learned from the one or more events, operations, or processes.

In additional aspect, the term cognitive may refer to an intelligent or "intelligence" system. The intelligent system may be a specialized computer system, or set of computer systems, configured with hardware and/or software logic (in combination with hardware logic upon which the software executes) to emulate human cognitive functions. These intelligent systems apply human-like characteristics to convey and manipulate ideas which, when combined with the inherent strengths of digital computing, can solve problems with a high degree of accuracy (e.g., within a defined percentage range or above an accuracy threshold) and resilience on a large scale. An intelligent system may perform one or more computer-implemented intelligent operations that approximate a human thought process while enabling a user or a computing system to interact in a more natural manner. The intelligent system may comprise artificial intelligence logic, such as natural language processing (NLP) based logic, for example, and machine learning logic, which may be provided as specialized hardware, software executed on hardware, or any combination of specialized hardware and software executed on hardware. The logic of the cognitive system may implement an intelligence (e.g., artificial intelligence "AI") operation(s), examples of which include, but are not limited to, question answering, identification of related concepts within different portions of content in a corpus, and intelligent search algorithms, such as Internet web page searches.

In general, such intelligence systems are able to perform the following functions: 1) Navigate the complexities of human language and understanding; 2) Ingest and process vast amounts of structured and unstructured data; 3) Generate and evaluate hypotheses; 4) Weigh and evaluate responses that are based only on relevant evidence; 5) Provide situation-specific advice, insights, estimations, determinations, evaluations, calculations, and guidance; 6) Improve knowledge and learn with each iteration and interaction through machine learning processes; 7) Enable decision making at the point of impact (contextual guidance); 8) Scale in proportion to a task, process, or operation; 9) Extend and magnify human expertise and cognition; 10) Identify resonating, human-like attributes and traits from natural language; 11) Deduce various language specific or agnostic attributes from natural language; 12) Memorize and recall relevant data points (images, text, voice) (e.g., a high degree of relevant recollection from data points (images, text, voice) (memorization and recall)); and/or 13) Predict and sense with situational awareness operations that mimic human cognition based on experiences.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, system memory 28 may include at least one program product having a set (e.g., at least one) of program modules that are configured to carry out the functions of embodiments of the invention.

Program/utility 40, having a set (at least one) of program modules 42, may be stored in system memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
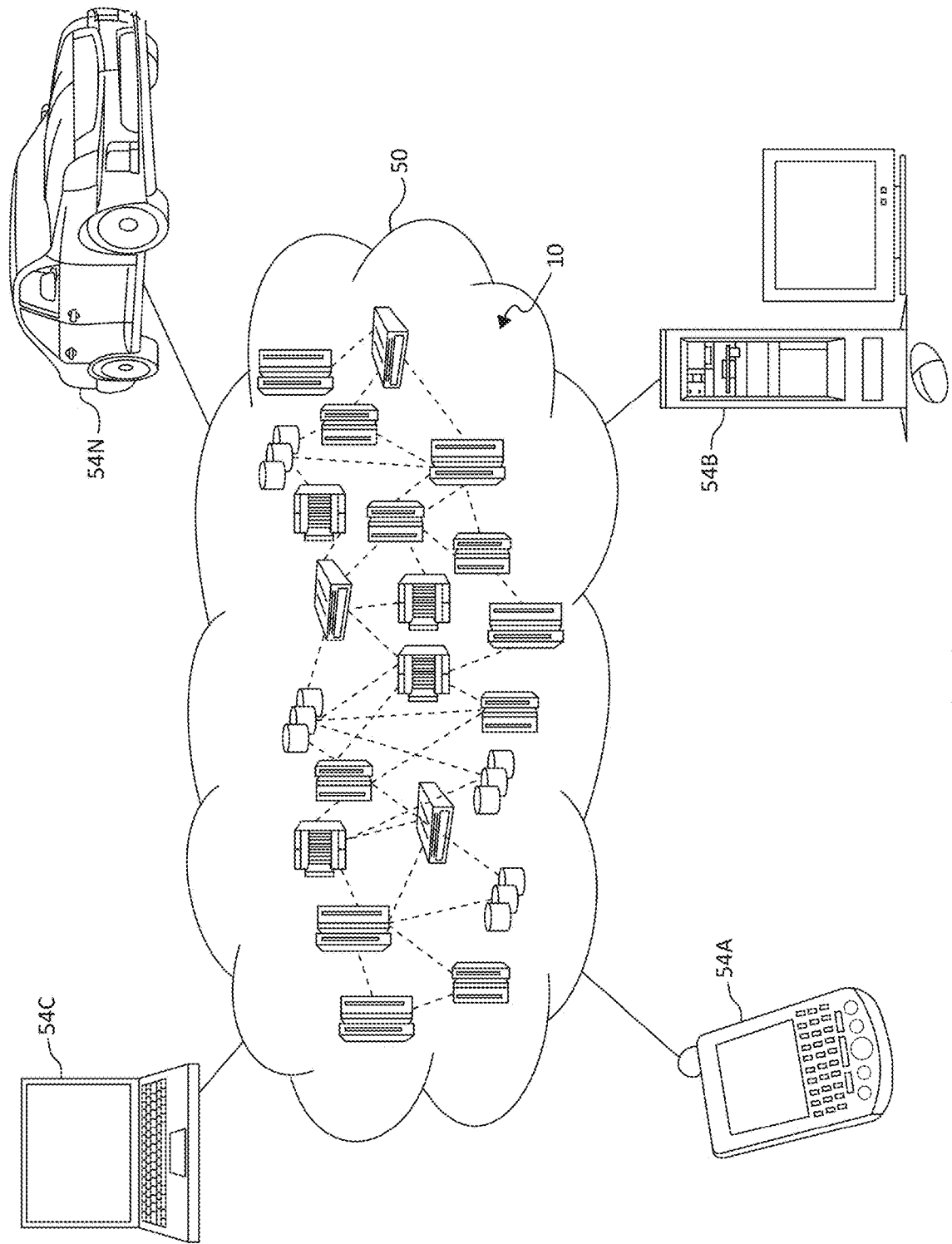
FIG. 2 is an additional block diagram depicting an exemplary cloud computing environment according to an embodiment of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
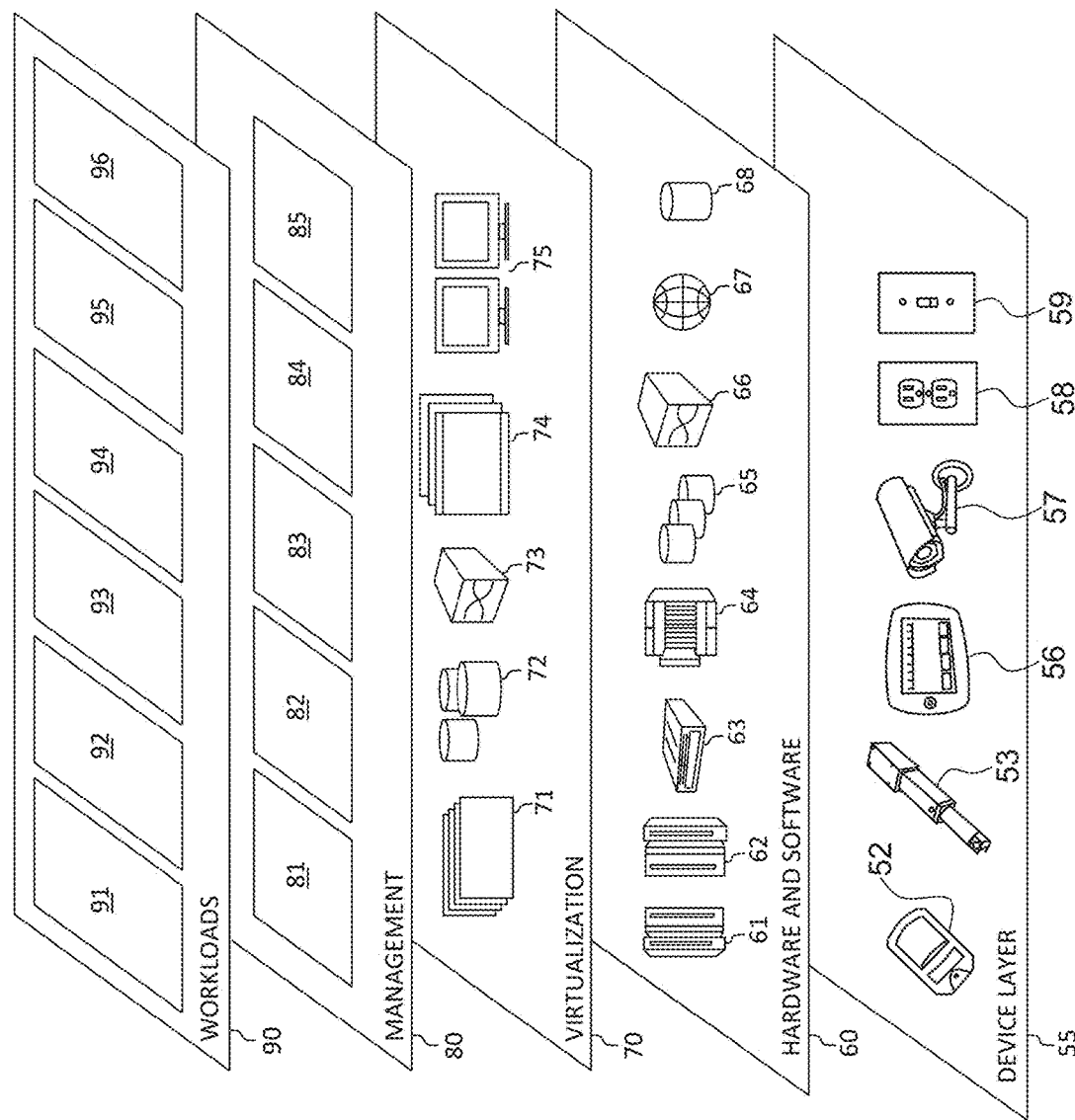
FIG. 3 is an additional block diagram depicting abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Device layer 55 includes physical and/or virtual devices, embedded with and/or standalone electronics, sensors, actuators, and other objects to perform various tasks in a cloud computing environment 50. Each of the devices in the device layer 55 incorporates networking capability to other functional abstraction layers such that information obtained from the devices may be provided thereto, and/or information from the other abstraction layers may be provided to the devices. In one embodiment, the various devices inclusive of the device layer 55 may incorporate a network of entities collectively known as the "internet of things" (IoT). Such a network of entities allows for intercommunication, collection, and dissemination of data to accomplish a great variety of purposes, as one of ordinary skill in the art will appreciate.

Device layer 55 as shown includes sensor 52, actuator 53, "learning" thermostat 56 with integrated processing, sensor, and networking electronics, camera 57, controllable household outlet/receptacle 58, and controllable electrical switch 59 as shown. Other possible devices may include, but are not limited to various additional sensor devices, networking devices, electronics devices (such as a remote-control device), additional actuator devices, so called "smart" appliances such as a refrigerator or washer/dryer, and a wide variety of other possible interconnected objects.

Hardware and software layer 60 include hardware and software components. Examples of hardware components include: mainframes 61; RISC (Reduced Instruction Set Computer) architecture-based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provides cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provides pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and, in the context of the illustrated embodiments of the present invention, various workloads and functions 96 for providing intelligent application scenario testing and error detection. In addition, workloads and functions 96 for providing intelligent application scenario testing and error detection may include such operations as data analytics, data analysis, and as will be further described, notification functionality. One of ordinary skill in the art will appreciate that the workloads and functions 96 for providing intelligent application scenario testing and error detection may also work in conjunction with other portions of the various abstractions layers, such as those in hardware and software 60, virtualization 70, management 80, and other workloads 90 (such as data analytics processing 94, for example) to accomplish the various purposes of the illustrated embodiments of the present invention.

Figure 4:
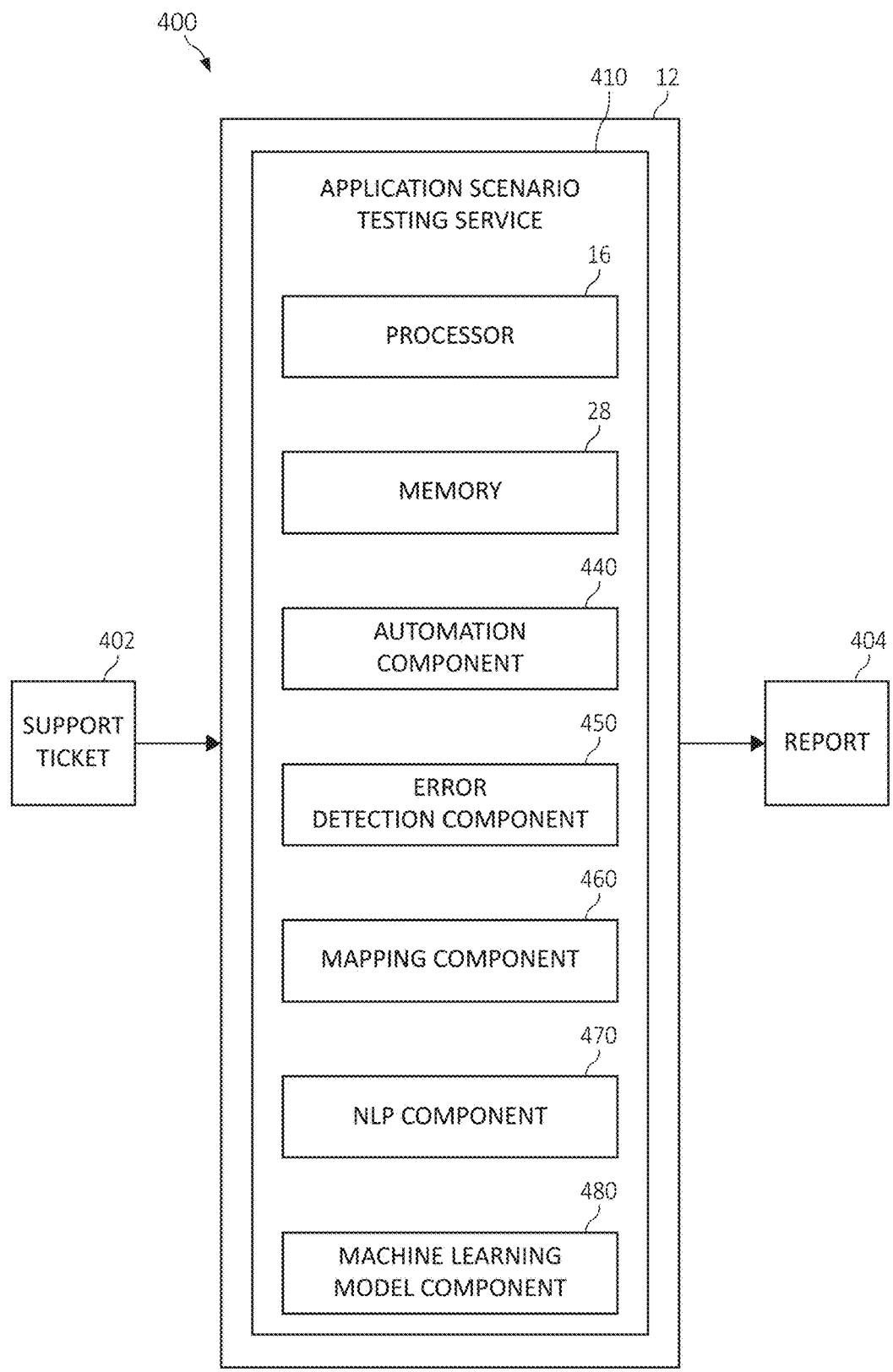
FIG. 4 is a diagram depicting various user hardware and computing components functioning in accordance with aspects of the present invention.

Turning now to FIG. 4, a block diagram depicting exemplary functional components 400 for providing intelligent application scenario testing and error detection according to various mechanisms of the illustrated embodiments is shown. In one aspect, one or more of the components, modules, services, applications, and/or functions described in FIGS. 1-3 may be used in FIG. 4. An intelligent application scenario testing service 410 is shown, incorporating processing unit ("processor") 420 to perform various computational, data processing and other functionality in accordance with various aspects of the present invention. The intelligent application scenario testing service 410 may be provided by the computer system/server 12 of FIG. 1. The processing unit 420 may be in communication with memory 430. The intelligent application scenario testing service 410 may also include an automation component 440, an error detection component 450, and a machine learning model component 480.

As one of ordinary skill in the art will appreciate, the depiction of the various functional units in the intelligent application scenario testing service 410 is for purposes of illustration, as the functional units may be located within the intelligent application scenario testing service 410 or elsewhere within and/or between distributed computing components.

In one aspect, the computer system/server 12 and/or the intelligent application scenario testing service 410 may provide virtualized computing services (i.e., virtualized computing, virtualized storage, virtualized networking, etc.). More specifically, the intelligent application scenario testing service 410 may provide, and/or be included in, a virtualized computing, virtualized storage, virtualized networking and other virtualized services that are executing on a hardware substrate.

In one aspect, the NLP component 470 may receive and/or consume data such as, for example, a support ticket 402. The NLP component 470 may run NLP and AI tools against the data such as, for example, a support ticket 402, learning the content via a natural language understanding ("NLU") such as by using the machine learning component 480. As the NLP component 470 (including the machine learning component 480) identifies, analyzes, mines, extracts, learns different sets of data (e.g., characters, keywords, phrases, sentences, etc.) of the support ticket 402 and may use the artificial intelligence to make cognitive associations or links. In one aspect, the NLP and AI services may include, for example, IBM® Watson®, which may be provided as a cloud service or as a local service (IBM® and Watson® are trademarks of International Business Machines Corporation).

The automation component 440 may automatically generate one or more modified application scenarios from an initial application scenario (learned from the support ticket 402) having configuration data and a plurality of operations relating to an error. The modified application scenarios are variations of the initial application. The automation component 440, in association with the error detection component 450, may detect the existence or non-existence of the error in the one or more modified application scenarios. The automation component 440 may identify those of the plurality of operations from the one or more modified application scenarios that are capable of being automated. Also, the automation component 440 may identify those of the plurality of operations of the one or more modified application scenarios unable to be automated.

The automation component 440, in association with the error detection component 450, may automatically repair one or more of the plurality of operations in those of the one or more modified application scenarios having a detected error.

Figure 5:
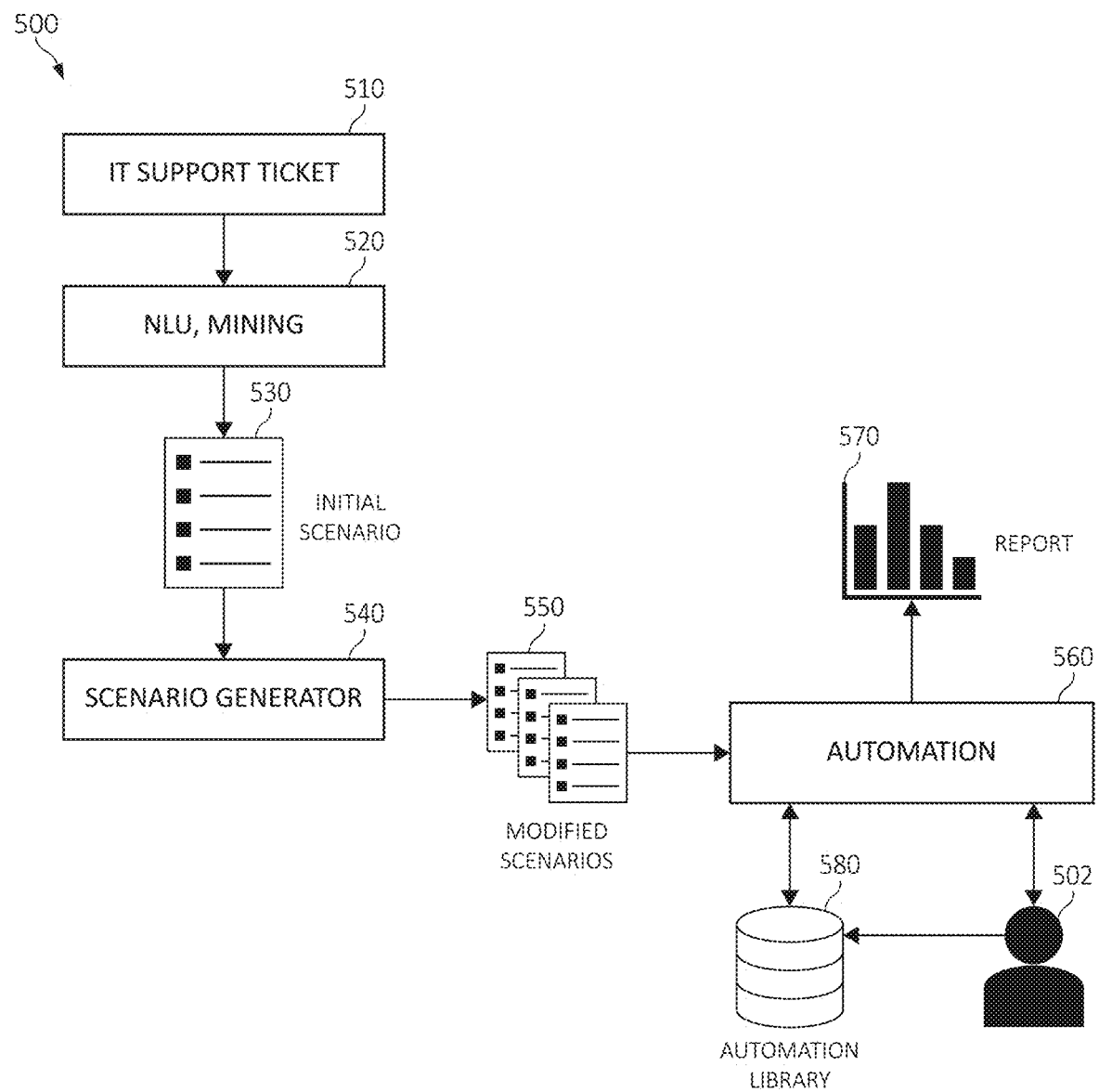
FIG. 5 is a diagram depicting operations for providing intelligent application scenario testing and error detection in accordance with aspects of the present invention.

The mapping component 460 may map each of the plurality of operations of the one or more modified application scenarios into a database such as, for example, an automation library (see automation library 580 of FIG. 5).

In an additional aspect, the automation component 440, in association with the NLP component and the error detection component 450, may extract each of the plurality of operations from the one or more modified application scenarios to reproduce the error. A report 404 with the tests results may be created, generated, and/or provided (as output data).

The machine learning component 480 may be initialize to collect data from each of the one or more modified application scenarios, train a machine learning model to learn and identify the error, the plurality of operations that produce the error, and each of the configurations for the plurality of operations, and automatically modify or eliminating one or more of the plurality of operations to detect the error in each of the one or more modified application scenarios.

In one embodiment, by way of example only, the machine learning component 480 as used herein may include, for example, an instance of IBM® Watson® such as Watson® Analytics (IBM® and Watson® are trademarks of International Business Machines Corporation). By way of example only, the machine learning component 480 may determine one or more heuristics and machine learning based models using a wide variety of combinations of methods, such as supervised learning, unsupervised learning, temporal difference learning, reinforcement learning and so forth. Some non-limiting examples of supervised learning which may be used with the present technology include AODE (averaged one-dependence estimators), artificial neural networks, Bayesian statistics, naive Bayes classifier, Bayesian network, case-based reasoning, decision trees, inductive logic programming, Gaussian process regression, gene expression programming, group method of data handling (GMDH), learning automata, learning vector quantization, minimum message length (decision trees, decision graphs, etc.), lazy learning, instance-based learning, nearest neighbor algorithm, analogical modeling, probably approximately correct (PAC) learning, ripple down rules, a knowledge acquisition methodology, symbolic machine learning algorithms, sub symbolic machine learning algorithms, support vector machines, random forests, ensembles of classifiers, bootstrap aggregating (bagging), boosting (meta-algorithm), ordinal classification, regression analysis, information fuzzy networks (IFN), statistical classification, linear classifiers, fisher's linear discriminant, logistic regression, perceptron, support vector machines, quadratic classifiers, k-nearest neighbor, hidden Markov models and boosting. Some non-limiting examples of unsupervised learning which may be used with the present technology include artificial neural network, data clustering, expectation-maximization, self-organizing map, radial basis function network, vector quantization, generative topographic map, information bottleneck method, IBSEAD (distributed autonomous entity systems based interaction), association rule learning, apriori algorithm, eclat algorithm, FP-growth algorithm, hierarchical clustering, single-linkage clustering, conceptual clustering, partitional clustering, k-means algorithm, fuzzy clustering, and reinforcement learning. Some non-limiting examples of temporal difference learning may include Q-learning and learning automata. Specific details regarding any of the examples of supervised, unsupervised, temporal difference or other machine learning described in this paragraph are known and are considered to be within the scope of this disclosure.

Turning now to FIG. 5, a block diagram of exemplary functionality 500 relating to providing intelligent application scenario testing and error detection\is depicted. As shown, the various blocks of functionality are depicted with arrows designating the blocks' 500 relationships with each other and to show process flow. Additionally, descriptive information is also seen relating each of the functional blocks 500. With the foregoing in mind, the module blocks 500 may also be incorporated into various hardware and software components of a system for transaction interaction analysis and summarization methods and features in accordance with the present invention, such as those described in FIGS. 1-4. Many of the functional blocks 500 may execute as background processes on various components, either in distributed computing components, or on the user device, or elsewhere.

Starting in block 510, an IT support ticket (or an event) may be identified (e.g., via monitoring or log processing a system) and a NLU operation may be performed on the IT support ticket to extract and/or mine data, as in block 520. The extracted and/or minded data includes one or more operation steps and/or configuration data to reproduce a problem in an initial scenario 530. It should be noted that in the event that the incoming IT support ticket, event, and/or log fails to include have the operation steps and/or configuration data, the IT support ticket, event, and/or log (at block 510) may be classified it to mine the data needed from the tickets of a class. Thus, the initial scenario 530 may be generated, created, and/or produced. In respect to the classification, a "class" here means tickets belonging to the same category. For example, tickets related to file system errors in a particular OS such as, for example, "ACME operating software 6.2." It should be noted that "ACME operating software 6.2" is used only for illustration purposes. In this case, a machine learning classifier may be trained to automatically identify whether or not a new ticket belongs to the class such as, for example, "file system errors in "ACME operating software 6.2". Furthermore, the training data for machine learning classifier may be consist in a collection of tickets describing various file system errors in the OS such as, for example, "ACME operating software 6.2.

In block 540, a scenario generator may analyze the initial scenario 530 and create, generate, and/or produce one or more modified scenarios 550, which may be variations of the initial scenario 530. In block 560, for each of the modified scenarios 550, a determination operation is performed to determine which of the operation steps of each of the modified scenarios 550 can be automatically performed by attempting to map of the operation steps to an automation mechanism (e.g., script) from an automation library 580. Those of the operation steps that are unable to be mapped to an automation mechanism (e.g., script) may be marked or noted. A user 502 (e.g., a subject matter expert "SMEs" or a machine learning operation) can extend the automation library 580 with one or more missing scripts to enable the operation steps to be mapped and/or automated. Also in block 560, each of the modified scenarios 550 may be executed to determine if an error occurs. A report 570 with the tests results may be provided, created, and/or updated.

In view of the various embodiments such as, for example, the operations of FIGS. 4 and 5, consider the following examples depicting the operations for providing intelligent application scenario testing and error detection.

For example, the operations for mining and generating the various operations and configuration date reproduce a problem reported in the ticket, assume an IT support ticket indicates that an error ("E1") is produced when action ("A1") is performed and configuration is a group of configuration ("cf") elements such as, for example, the configuration elements of {cf1, cf2, cf3, . . . cfN}.

First, the data of E1, A1, and CF={cf1, cf2, cf3, . . . cfN} may be extracted. For the extraction process, a) given a ticket corpus, one or more instances (e.g., a few hundred instances) of E, A and CF may be annotate. Each instance of E, A and CF may be a span of text in the IT ticket.

Second, an E, A and CF recognition model may be learned and/or generated based on the annotated corpus.

Third, given a new IT support ticket, the trained E, A and CF recognition model may be applied to identify: a) text spans of E, A and CF, one or more valid triples of E, A and CF (e.g., some IT tickets may contain multiple Es and their corresponding A/CF. A subset of configuration elements such as, for example, cf1 and cf3 only, which reproduces E1 by starting with all configuration elements to reproduce E1. One or more configuration from a CF may be eliminated, dropped, or removed and then a determination operation may be performed to determine/check if the E1 is reproducible or if it is unreproducible. If the E1 is not reproducible with dropping any cfi (e.g., the cf1, cf2, cf3, . . . cfN) in the CF, the CF may be returned. If the E1 is reproducible by dropping one or more of cfi (e.g., one or more of the cf1, cf2, cf3, . . . cfN) in the CF, then CF' may be a group of configuration elements without one configuration from CF, which reproduces E1 and CF=CF' may be set.

Additionally, to identify similar applications that need to be fixed/addressed, each of the previously mined/extracted tickets (e.g., historical data) may be maintained and stored in a database (e.g., the automation library) such as, for example, where E1 is an error, A1 is an action, cf1, . . . , cfN are configurations. It should be noted, by way of example only, "similar application" may correspond to applying a similar (e.g., modified) scenario to the same application running in similar configurations. Also, "similar application" may be defined as applications from the same or similar category (e.g., operating systems, or database systems, etc.) but may be slightly different versions, or they may be the same version but slightly different distributions. For example, we assume that a first OS (e.g., ACME 12) is similar to second type of OS (e.g., XYZ OS version 6), or first OS such as, for example, ACME 12.04 is similar to a different version of the first OS (e.g., ACME 12.04).

For example, a first OS (e.g., ACME version 12) may be similar to as second type of OS (e.g., XYZ OS version 6). For example, if an error is observed for an object-relational database on the first OS (e.g., ACME version 12) with a sequence of commands passed there, the present invention may attempt to check whether the same error could be observed by running the object-relational database on the second type of OS (e.g., XYZ OS version 6) with the same commands. A machine learning operation may pre-populate configuration pairs considered to be similar (e.g., similar pair) such as, for example, a first operating system version "6.5" is similar to a second operating system version "6.5." At this point, assume that a support ticket is newly created with error E1, but the same configurations are not found in the previously mined tickets. Thus, a machine learning operation may use action A1 with configurations stored in the automation library and then one or more of the configurations of A1 may be replaced with similar patterns.

In one aspect, the present invention may perform one or more of the following operations for mining extracting data from the support ticket for generating the various modified scenarios. In one aspect, for a support ticket that suggests that error E1 is produced when action A1 is performed and configuration is a group of the configuration elements {cf1, cf2, cf3, . . . cfN}. By performing the data mining, a machine learning operation (e.g., an NLU/AI operation) may understand which of the configuration elements directly related to the action A1 such as, for example, cf1 and cf3. The machine learning operation may obtain the current system info for cf1 and cf3 and compare to recommended settings for cf1 and cf3 (e.g., these could be mined from available product information). The machine learning operation may obtain information about these configuration elements (e.g., cf1 and cf3) for a one or more other applications that do not experience any errors (e.g., obtain through mining historical data). The machine learning operation may use the obtained information to establish boundaries of allowed variations for these configuration elements (e.g., cf1 and cf3). The machine learning operation may understand the configuration elements/components (e.g., cfi) that produce the error E1 and also establish and determine what kind/type of errors may be similar to error E1.

In an additional aspect, assume there is support ticket that suggests that error E1 is produced when action A1 is performed and configuration is a group of the configuration elements {cf1, cf2, cf3, . . . cfN}. By performing the data mining, a machine learning operation (e.g., an NLU/AI operation) may identify similar applications that need to be repaired, fixed/corrected, and/or updated. Thus, at this point the present invention now includes "allowed variations" for configuration elements and errors from historical data stored in a database, which may be produced. (The "allowed variations" may be historically learned variations from historical tickets stored in a library and/or allowed variations determined based on historical tickets, but also during a generation of one or unknown/unseen scenarios).

A machine learning operation may define similarity in these terms, define a search in the historical data to identify possible applications where similar issues exist, and generate various tests for these applications.

Figure 6:
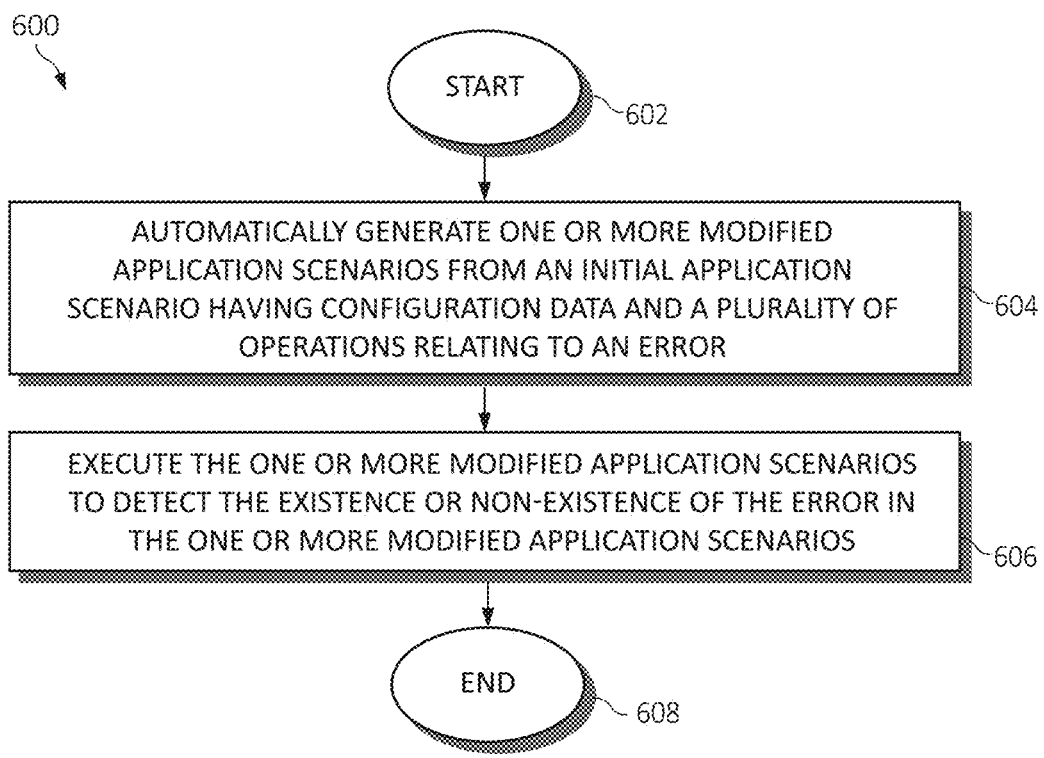
FIG. 6 is a flowchart diagram depicting an additional exemplary method for automatically providing intelligent application scenario testing and error detection in accordance with aspects of the present invention.

FIG. 6 is an additional flowchart diagram depicting functionality 600 of an exemplary method for automatically providing intelligent application scenario testing and error detection, again in which various aspects of the present invention may be realized. The functionality 600 may be implemented as a method executed as instructions on a machine, where the instructions are included on at least one computer readable medium or one non-transitory machine-readable storage medium. The functionality 600 may start in block 602.

One or more modified application scenarios may be automatically generated from an initial application scenario having configuration data and a plurality of operations relating to an error, as in block 604. The one or more modified application scenarios are variations of the initial application. The one or more modified application scenarios may be executed to detect the existence or non-existence of the error in the one or more modified application scenarios, as in block 606. The functionality 600 may end, as in block 608.

Figure 7:
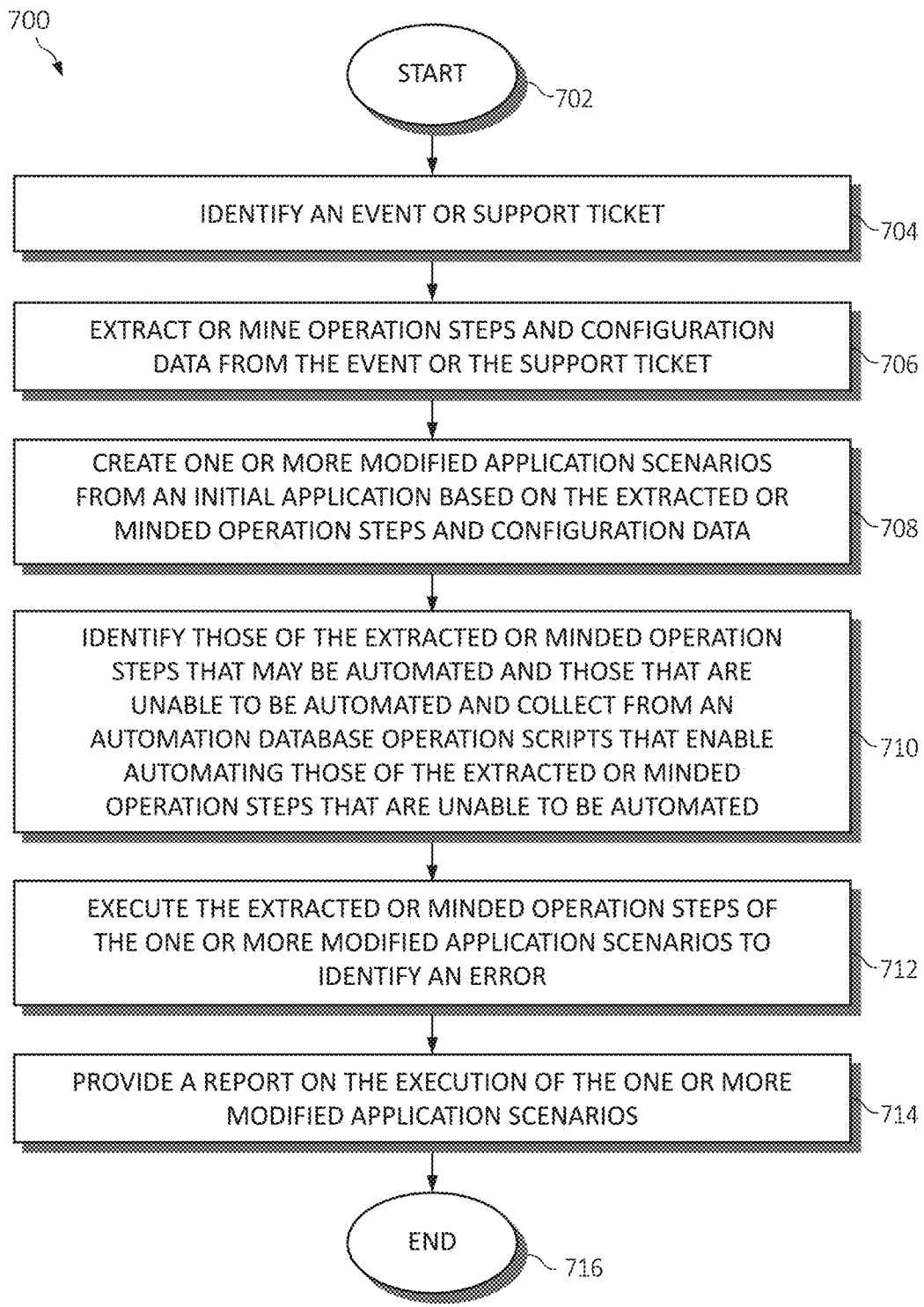
FIG. 7 is an additional flowchart diagram depicting an additional exemplary method for automatically providing intelligent application scenario testing and error detection in accordance with aspects of the present invention, again in which various aspects of the present invention may be realized.

FIG. 7 is an additional flowchart diagram 700 depicting an additional exemplary method for automatically providing intelligent application scenario testing and error detection, again in which various aspects of the present invention may be realized. The functionality 700 may be implemented as a method executed as instructions on a machine, where the instructions are included on at least one computer readable medium or one non-transitory machine-readable storage medium. The functionality 700 may start in block 702.

An event (e.g., an incident) or support ticket may be identified, as in block 704. Operation steps and configuration data may be mined and extracted from the event or the support ticket, as in block 706. One or more modified application scenarios may be created (e.g., generated, produced, developed, and/or provided) from an initial application based on the extracted or minded operation steps and configuration data, as in block 708. Those of the extracted or minded operation steps that may be automated and those that are unable to be automated may be identified and operation scripts that enable automating those of the extracted or minded operation steps that are unable to be automated may be collected from an automation database, as in block 710. The extracted or minded operation steps of the one or more modified application scenarios may be extracted to identify an error, as in block 712. A report on the execution of the one or more modified application scenarios may be provided, as in block 714. The functionality 700 may end, as in block 716.

In one aspect, in conjunction with and/or as part of at least one block of FIGS. 6-7, the operations of methods 600 and/or 600 may include each of the following. The operations of methods 600 and/or 700 may automatically repair one or more of the plurality of operations in those of the one or more modified application scenarios having a detected error. The operations of methods 600 and/or 700 may identify those of the plurality of operations from the one or more modified application scenarios that are capable of being automated. The operations of methods 600 and/or 700 may identify those of the plurality of operations of the one or more modified application scenarios unable to be automated.

The operations of methods 600 and/or 700 may map each of the plurality of operations of the one or more modified application scenarios into an automation library, and/or extract each of the plurality of operations from the one or more modified application scenarios to reproduce the error.

The operations of methods 600 and/or 700 may initialize a machine learning mechanism to collect data from each of the one or more modified application scenarios, train a machine learning model to learn and identify the error, the plurality of operations that produce the error, and each of the configurations for the plurality of operations, and automatically modify or eliminating one or more of the plurality of operations to detect the error in each of the one or more modified application scenarios, and/or receive feedback data via an interactive graphical user interface (GUI) on one or more Internet of Things (IoT) devices.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowcharts and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowcharts and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowcharts and/or block diagram block or blocks.

The flowcharts and block diagrams in the Figures illustrate the architecture, functionality, and operation of possible implementations of systems, methods, and computer program products according to various embodiments of the present invention. In this regard, each block in the flowcharts or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts or carry out combinations of special purpose hardware and computer instructions.

The invention claimed is:

1. A method for providing intelligent application scenario testing and error detection by a processor, comprising:
   automatically generating one or more modified application scenarios from an initial application scenario having configuration data and a plurality of operations relating to an error, wherein the one or more modified application scenarios are variations of the initial application scenario; and
   executing the one or more modified application scenarios to detect an existence or non-existence of the error in the one or more modified application scenarios, wherein the detecting of the existence or non-existence of the error includes comparing configuration elements of the one or more modified application scenarios of a first application to configuration elements of a second application different than the first application, wherein the comparing includes identifying, based on the detection of the existence or non-existence of the error in the first application, the configuration elements of the second application which necessitate modification to mitigate a second error in the second application similar to the error in the first application, and wherein information is extracted from a support ticket describing the error by a machine learning mechanism to determine allowed variation boundaries of the configuration elements of the first application and the configuration elements of the second application through examination of recommended settings in available product information, and examination of configuration elements of one or more additional applications not experiencing the error.

2. The method of claim 1, further including automatically repairing one or more of the plurality of operations in the one or more modified application scenarios having the detected existence.

3. The method of claim 1, further including identifying operations of the plurality of operations from the one or more modified application scenarios that are capable of being automated.

4. The method of claim 1, further including mapping each of the plurality of operations of the one or more modified application scenarios into an automation library.

5. The method of claim 1, further including identifying operations of the plurality of operations of the one or more modified application scenarios that are unable to be automated.

6. The method of claim 5, further including extracting each of the plurality of operations from the one or more modified application scenarios to reproduce the error.

7. The method of claim 1, wherein initializing the machine learning mechanism further includes:
   collecting data from each of the one or more modified application scenarios;
   training a machine learning model to learn and identify the error, the plurality of operations that produce the error, and each configuration for the plurality of operations; and
   automatically modifying or eliminating one or more of the plurality of operations to detect the error in each of the one or more modified application scenarios.

8. A system for providing intelligent application scenario testing and error detection in a computing environment, comprising:
   one or more computers with executable instructions that when executed cause the system to:
   automatically generate one or more modified application scenarios from an initial application scenario having configuration data and a plurality of operations relating to an error, wherein the one or more modified application scenarios are variations of the initial application scenario; and
   execute the one or more modified application scenarios to detect an existence or non-existence of the error in the one or more modified application scenarios, wherein the detecting of the existence or non-existence of the error includes comparing configuration elements of the one or more modified application scenarios of a first application to configuration elements of a second application different than the first application, wherein the comparing includes identifying, based on the detection of the existence or non-existence of the error in the first application, the configuration elements of the second application which necessitate modification to mitigate a second error in the second application similar to the error in the first application, and wherein information is extracted from a support ticket describing the error by a machine learning mechanism to determine allowed variation boundaries of the configuration elements of the first application and the configuration elements of the second application through examination of recommended settings in available product information, and examination of configuration elements of one or more additional applications not experiencing the error.

9. The system of claim 8, wherein the executable instructions when executed cause the system to automatically repair one or more of the plurality of operations in the one or more modified application scenarios having the detected existence.

10. The system of claim 8, wherein the executable instructions when executed cause the system to identify operations of the plurality of operations from the one or more modified application scenarios that are capable of being automated.

11. The system of claim 8, wherein the executable instructions when executed cause the system to map each of the plurality of operations of the one or more modified application scenarios into an automation library.

12. The system of claim 8, wherein the executable instructions when executed cause the system to identify operations of the plurality of operations of the one or more modified application scenarios that are unable to be automated.

13. The system of claim 8, wherein the executable instructions when executed cause the system to extract each of the plurality of operations from the one or more modified application scenarios to reproduce the error.

14. The system of claim 8, wherein the executable instructions when executed cause the system to initialize the machine learning mechanism to:
    collect data from each of the one or more modified application scenarios;
    train a machine learning model to learn and identify the error, the plurality of operations that produce the error, and each configuration for the plurality of operations; and
    automatically modify or eliminate one or more of the plurality of operations to detect the error in each of the one or more modified application scenarios.

15. A computer program product for providing intelligent application scenario testing and error detection in a computing environment by a processor, the computer program product comprising a non-transitory computer-readable storage medium having computer-readable program code portions stored therein, the computer-readable program code portions comprising:
    an executable portion that automatically generates one or more modified application scenarios from an initial application scenario having configuration data and a plurality of operations relating to an error, wherein the one or more modified application scenarios are variations of the initial application scenario; and
    an executable portion that executes the one or more modified application scenarios to detect an existence or non-existence of the error in the one or more modified application scenarios, wherein the detecting of the existence or non-existence of the error includes comparing configuration elements of the one or more modified application scenarios of a first application to configuration elements of a second application different than the first application, wherein the comparing includes identifying, based on the detection of the existence or non-existence of the error in the first application, the configuration elements of the second application which necessitate modification to mitigate a second error in the second application similar to the error in the first application, and wherein information is extracted from a support ticket describing the error by a machine learning mechanism to determine allowed variation boundaries of the configuration elements of the first application and the configuration elements of the second application through examination of recommended settings in available product information, and examination of configuration elements of one or more additional applications not experiencing the error.

16. The computer program product of claim 15, further including an executable portion that automatically repairs one or more of the plurality of operations in the one or more modified application scenarios having the detected existence.

17. The computer program product of claim 15, further including an executable portion that:
    identifies operations of the plurality of operations from the one or more modified application scenarios that are capable of being automated; or
    identifies operations of the plurality of operations of the one or more modified application scenarios that are unable to be automated.

18. The computer program product of claim 15, further including an executable portion that maps each of the plurality of operations of the one or more modified application scenarios into an automation library.

19. The computer program product of claim 15, further including an executable portion that extracts each of the plurality of operations from the one or more modified application scenarios to reproduce the error.

20. The computer program product of claim 15, wherein an executable portion that initializes the machine learning mechanism further includes executable portions that:
    collects data from each of the one or more modified application scenarios;
    trains a machine learning model to learn and identify the error, the plurality of operations that produce the error, and each configuration for the plurality of operations; and
    automatically modifies or eliminates one or more of the plurality of operations to detect the error in each of the one or more modified application scenarios.

* * * * *